Dec. 9, 1969   K. R. CURWEN   3,482,440
ENGINE LIFE RECORDER
Filed April 8, 1968   2 Sheets-Sheet 1
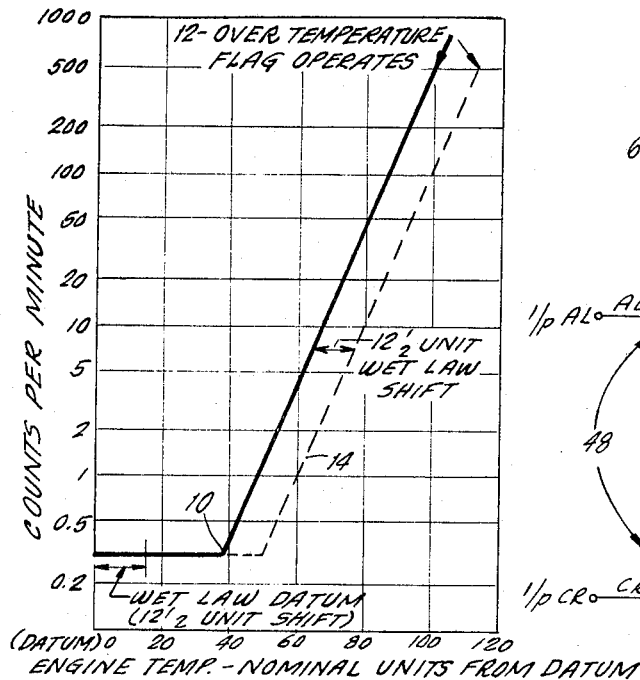
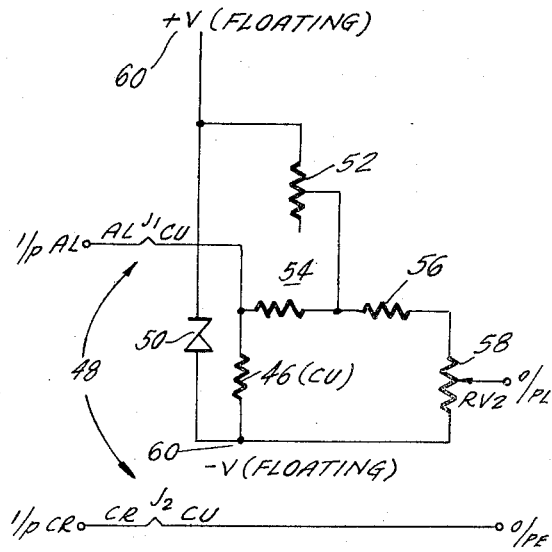
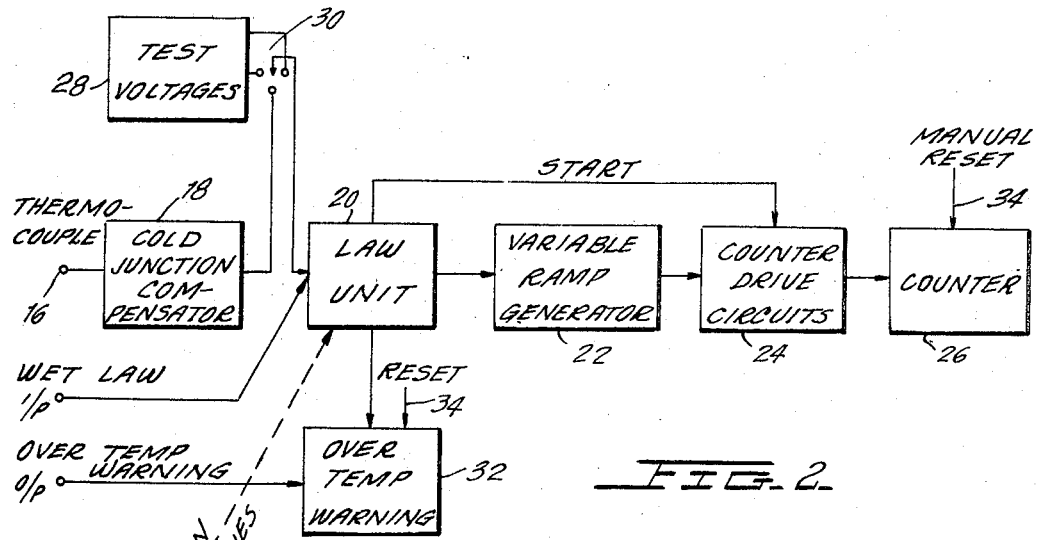
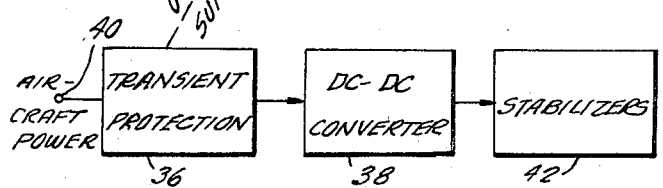
INVENTOR.
KENNETH ROBERT CURWEN
BY
OSTROLENK, FABER, GERB & SOFFEN
ATTORNEYS

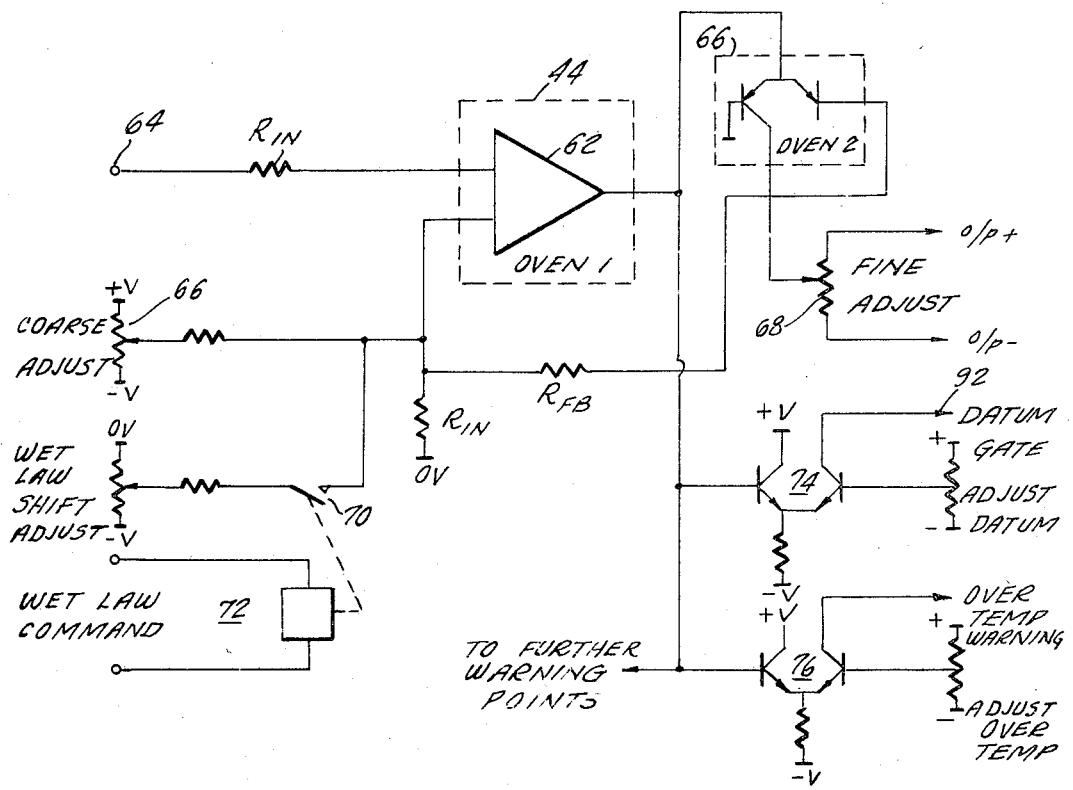
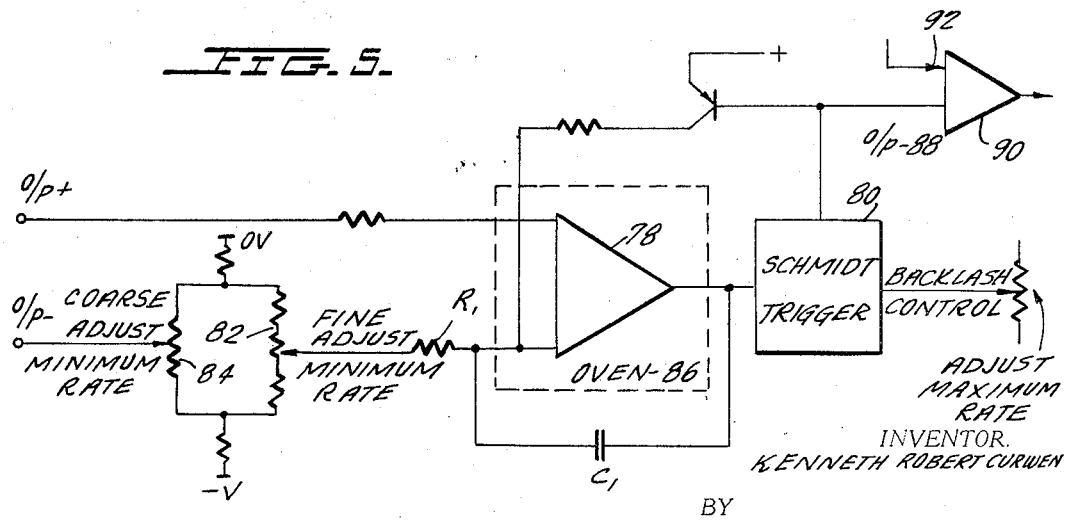

ative to said parameter can be plotted as a curve, whether said curve is linear with changing parameter; logarithmic with changing parameter; exponential; inverse to change of parameter; or a curve having two sectors of differing slope with change of parameter.

United States Patent Office
3,482,440
Patented Dec. 9, 1969

3,482,440
ENGINE LIFE RECORDER
Kenneth Robert Curwen, Southampton, England, assignor to Kollsman Instrument Corporation, Syosset, N.Y., a corporation of New York
Filed Apr. 8, 1968, Ser. No. 719,660
Claims priority, application Great Britain, Aug. 17, 1967, 38,037/67
Int. Cl. G01n 25/30
U.S. Cl. 73—116                                    12 Claims

ABSTRACT OF THE DISCLOSURE

A recording device for determining and recording the consumed life of equipment such as a jet engine wherein the consumed life is dependent not only on time but at least on one other parameter such as temperature. A temperature responsive means such as a thermo-couple produces a voltage representative of temperature which is fed into an electronic conversion apparatus which will produce an output signal representative of the instantaneous rate of deterioration for the particular temperature in accordance with an empirically determined function for the particular equipment under observation. A signal generator such as a variable ramp generator is responsive to the output signal and produces driving signals at a repetitive rate in accordance with the magnitude of the aforesaid output signal. A counter accumulates the driving signals to provide an indication of the consumed life of the equipment.

---

This invention relates to engine life recorders, and more particularly to an engine life recorder which will indicate consumed life of an engine or other equipment as a function of the operating temperature of said engine or equipment.

It is well known that one of the factors that affect the life of internal combustion engines and gas turbine engines is the temperature at which the engines operate.

The heat energy to be dissipated is the source of many problems associated with the performance of these engines and is one of the primary causes of engine deterioration. Those parts that are particularly subjected to heat deterioration are commonly referred to as engine hot sections and the metals used in the components of these engine hot sections deteriorate and change dimensions at a predictable rate.

The rate of deterioration can be plotted as a stress rupture function against increasing temperature and it is referred to as a hot section factor curve or engine life curve. For each type of engine a hot section factor curve is available.

For all engines these curves can be plotted as log functions to produce straight lines when plotted on semi-log chart paper. Such curves show that the rate of deterioration doubles when considered at certain regular intervals of increasing temperature.

It is obvious, therefore, that the life of an internal combustion engine or gas turbine is not dependent solely upon a predetermined number of hours of running but is dependent also upon the varying temperature at which it is run and that the rate at which such engines deteriorate due to heat can be represented by the aforesaid log-function.

The above example of internal combustion engines and gas turbines are quoted by way of example only since it will be appreciated that any equipment that has an effective service life that can be specified as a known function of one or more parameters and time, has a life that is dependent not only on time but also on said parameters.

The present invention is applicable to all such equipment wherein the rate of deterioration due to said parameter can be plotted as a curve, whether said curve is linear with changing parameter; logarithmic with changing parameter; exponential; inverse to change of parameter; or a curve having two sectors of differing slope with change of parameter.

It is an object of the present invention, therefore, to provide a recorder that is capable of monitoring and recording the consumed life of any equipment of which the service time is dependent not only on time but also on the aforesaid parameter, the recording being effected at a varying rate dependent upon the nature of the aforesaid curves.

In particular it is an object of the present invention to provide an engine hot section recorder that can be used to monitor and record temperature/time exposures of engine hot sections at variable rate dependent upon the aforesaid hot section factor curve, or a shift of said curve, so that the consumed life of the engine can be accurately determined.

According to the present invention there is provided a recorder comprising a law unit receiving a voltage that is a measure of the parameter existing in the equipment being monitored, said law unit giving an output current that is proportional to the corresponding coordinate of the aforesaid curve representing the deterioration rate of the equipment for varying values of said parameter, and a variable ramp generator the repetitive output rate of which is proportional to the output of the law unit, and a counter driving circuit responsive to said variable ramp generator.

In a preferred embodiment the driving circuit is gated with a datum signal from the law unit such that no count occurs below a predetermined datum.

Where the invention is applied to internal combustion engines or gas turbines, the E.M.F. from one or more thermocouples responsive to engine hot section temperature is fed to a cold junction compensator that corrects said E.M.F. to allow for ambient temperature variation, the corrected E.M.F. being fed to the aforesaid law unit.

In order that the present invention may be clearly understood, one embodiment thereof will now be described with reference to the accompanying drawings and wherein:

FIGURE 1 is a graph illustrating a Nominal Law Unit characteristic;

FIGURE 2 shows a schematic circuit of the invention;

FIGURE 3 illustrates the circuitry of a cold junction compensator utilized in the practice of the instant invention;

FIGURE 4 illustrates the circuitry of the Law Unit; and

FIGURE 5 illustrates the circuitry of the Variable Ramp Generator.

FIGURE 1 shows a typical graph wherein the rate at which an engine deteriorates with temperature has its coordinates expressed in terms of counts per minute, the vertical coordinates having been plotted on a log scale so that the resulting curve is a straight line with respect to the abscissa axis of engine temperature. The curve also defines a datum temperature 10 below which the counts per minute by the recorder are constant and an upper temperature 12 above which the recorder will give a warning signal.

The recorder to be described includes means whereby the curve of FIGURE 1 can be shifted from its full line position to its broken line position 14 on pilot selection of water injection for the engine (wet law). Obviously water injection should and does lower the deterioration rate.

The recorder illustrated schematically in FIGURE 2 is designed to accept inputs from any device which presents a signal representative of engine temperature, preferably a parallel arrangement of engine mounted Chromel/ Alumel thermo-couples, and to display numerically an accumulated count representing consumed life of the engine, the rate of count being related to engine temperature in accordance with the graph of FIGURE 1 which is empirically determined for the engine under consideration. With the engine having a known maximum count (representing lifetime of the engine), personnel will know how much life is left at all times. Alternatively by checking before and after a particular operation, personnel will appreciate when the engine has been experiencing use at high temperatures.

The E.M.F. signal from the thermo-couples 16 (only one of which is shown in FIGURE 2) is fed to a cold junction compensator 18 which corrects the E.M.F. for ambient temperature variation, in a manner to be further described. The corrected E.M.F. is fed to a law unit 20 which provides an output voltage proportional to the count rate required on the curve of FIGURE 1 for the particular temperature at which the engine is operating at. As will be shown, the law unit 20 also serves to define the aforesaid datum point, wet law shift, and over temperature warning point. The law unit 20 is preferably a plug-in module within the recorder so that alternative law units may be fitted in service if different characteristics are required for the same engine, or if a different engine is being monitored.

The output voltage of the law unit 20 is fed to a variable ramp generator 22 with the repetition rate of this generator being proportional to the output voltage from the law unit 20.

The pulse generated at each repetition of the variable ramp generator 22 are appropriately shaped by counter drive circuits 24 which drive a counter 26 which will, therefore, accumulate (i.e., integrate) the total counts to indicate consumed life of the engine. In other words, there will be an integration of a varying count rate (varying as a function of temperature) over the time the engine is running. In a preferred embodiment the pulses generated at each repetition of the variable ramp generator 22 are gated by datum point detection circuitry, to be further explained, such that there will be no accumulation in counter 26 unless the engine is operating above the datum point temperature illustrated in FIGURE 1. In this preferred embodiment, the counter may be uniformly stepped as a function of running time alone, or, as suggested, no accumulation will take place (this last case being for situations where temperature considerations are significantly more important from the viewpoint of consumed life than time.

Press to test facilities 28 are also provided on the recorder. The testing facilities include a single pole multi-throw switch 30 by which two test conditions may be initiated. In the first condition a known voltage is injected into the law unit 20; and if everything is operating properly, a known count will be accumulated. In the second condition a fixed voltage which should just trigger an over temperature warning device 32 is injected. If everything is operating properly a danger flag will appear. The counter 26 and over temperature warning device 32 include reset buttons 34 by which the respective devices can be returned to their condition immediately before testing.

The recorder has built-in power supplies which include a transient protection circuit 36, of suitable design, followed by a D.C. to D.C. converter 38, of suitable design. This arrangement provides a source for the recorder which, in the event the recorder is mounted in an aircraft, operates fully isolated from the aircraft's standard 28 v. D.C. supply, indicated generally at 40. Preferably a stabilizer 42 is added.

Ambient temperature stability of the unit is assured by enclosing the temperature sensitive components in solid state temperature stable ovens 44, as illustrated in FIGURES 4 and 5.

As well known in the art, a thermo-couple includes a hot junction (at the engine) and a cold junction. Since the recorder of the instant invention contains the aforesaid cold junction of the measuring thermo-couple system, the compensating circuit 18 must be fitted to correct for ambient temperature variation on this cold junction. As shown in FIGURE 3 the compensator circuit utilizes a copper resistor 46 which has a linear temperature coefficient, fed with such a current that the potential on its terminals changes by a similar amount to the change of each E.M.F. of the thermo-couple cold junction 48. Since the cold junction E.M.F. itself is slightly non-linear with temperature, a Zener diode 50 is incorporated to provide a temperature varying current at 46. Variable resistor 52 and resistor 54 with the Zener diode 50 defines this current with resistor 56 and variable resistor 58 providing a balance. The power supply 60 to this circuit floats from earth.

As noted previously, the law unit is designed to produce an output signal representative of the instantaneous rate of deterioration for a particular temperature. (The graph of FIGURE 1.) These characteristics are empirically determined in advance for the equipment to be monitored and are reproduced by means such as an exponential transistor which will produce a similar function. The law units include the following components:

*Amplifier.*—This circuit consists of an integrated circuit amplifier 62 connected in the "boot-stray" mode such as to feed the amplifier input voltage at 64 to the emitters of a "twin" transistor 66 (two transistor chips of the same type housed in a single TO5 can). Both the amplifier 62 and the "twin" transistor 66 are housed in ovens 44. One of the "twin" is diode connected within the feedback loop to provide compensation both for residual temperature change in the oven and during warm-up periods.

Since the input voltage is of the same order as the amplifier's basic offset voltage it is necessary to use a coarse control 66 and a fine control 68 to set up the location of the output characteristics of the law unit. A further offset is introduced by contact 70 which is operated by the wet law command 72 which, as noted previously, will shift the graph of FIGURE 1.

*Exponential transistor.*—The $V_{be}$-$I_c$ characteristic for the two selected transistors 66 is such that the output current of this pair is exponential with input voltage over five decades of output current and this mode of use provides the rising characteristic of the graph of FIGURE 1. Thus the transistors 66 constitute a function generator and determine a transfer function which is a smooth continuous exponential function that matches the graph of FIG. 1 along its principal region.

*Start and warning circuits.*—The signal fed to the "twin" transistor 66 is also used to switch two or more emitter coupled pairs of transistors 74, 76. In the instant example one transistor 74 is biased to switch at the datum point 10, and the other 76 is biased to switch at the over temperature point 12. As noted previously, the latter event is used to operate a mechanically latched over temperature flag (not shown) in an over temperature warning device 32. If desired, contacts on the flag can be fed to the aircraft centralized warning system.

*Variable ramp generator (FIGURE 5).*—This circuit consists of a Miller ramp generator 78, of known design, whose rate of rise (aiming voltage) is proportional to an input voltage, followed by a Schmitt trigger 80 which fires at a particular point on this ramp and inserts a new, inverted, aiming voltage. This latter is chosen such that the recovery cycle is negligible at the highest count rate.

At a particular point on this recovery ramp the Schmitt 80 triggers back and permits reversion to the initial state.

The minimum count rate is set by putting a small offset into the unit with the fine adjustment potentiometer 82. The coarse adjustment potentiometer 84 corrects the amplifier's basic offset which once again is of the same order as the minimum input signal. The Miller ramp generator 78 is an integrated circuit amplifier contained in an oven 86 for temperature stabilization.

An output pulse 88 is derived from the Schmitt trigger 80 on the recovery cycle which is gated at 90 with the datum signal 92 from the law unit 20 such that no count occurs below the datum points. This gated signal operates a relay (not shown) which transfers the signal to counter drive circuit 24 where it is shaped to step the counter 26. This counter 26 is a special five-digit solenoid operated counter with a step-by-step reset facility.

It has been found that a recorder constructed according to the present invention is capable of assessing the expended life of a gas turbine engine with high accuracy and reliability under stringent environmental conditions. This is done on the assumption that the life of the engine is primarily a function of count rate in itself a function of temperature, and time.

By use of a recorder constructed according to the present invention scheduled removal of engines can be conducted on a time-temperature basis which is more accurate than the practice of removing engines on a pure "hours run" basis. Furthermore, investigation can be instigated if the recorder has accumulated excessive counts for the flight profile of a given mission.

As already stated, the law unit is preferably of the plug-in type so that it can be replaced with other law units of different output characteristics, so that the recorder may be used to determine the life of any equipment which the service time can be specified as a known function of a single time parameter and time.

Although there has been described a preferred embodiment of this novel invention, many variations and modifications will now be apparent to those skilled in the art.

The embodiments of the invention in which an exclusive privilege or property is claimed are defined as follows:

1. A device for determining the consumed life of equipment of which the consumed life is dependent on time and at least one other parameter, temperature, said device comprising: thermocouple means responsive to the heat generated by said equipment for generating an input signal, compensator means coupled to said thermocouple means for providing a corrected input signal representative of temperature for ambient temperature variation, said thermocouple means including a hot junction operatively connected to said equipment and a cold junction operatively connected to said compensator means, conversion means responsive to said corrected input signal for producing an output signal representative of the instantaneous rate of deterioration per unit time of said equipment, signal generator means responsive to said output signal for producing driving signals at a repetitive frequency representative of the instantaneous value of said output signal; and counter means responsive to said driving signals for accumualting the total number of said driving signals; whereby the consumed operating life of said equipment can be computed for a given length of operating time.

2. The device of claim 1, wherein said compensator means includes resistive means having a predetermined linear temperature coefficient; and power supply means for establishing a current through said resistive means; the potential appearing across said resistive means varying the magnitude of said corrected input signal, the potential appearing across said resistance means varying to the same extent as the potential difference of said cold junction varies with changing temperatures.

3. The device of claim 2, wherein said compensator means further includes circuit components for providing a temperature varying current to said resistive means whereby non-linear changes in potential difference of said cold junction with changing temperature can be compensated.

4. A device for determining the consumed life of equipment of which the consumed life is dependent on time and at least one other parameter, said device comprising: conversion means responsive to an input signal representative of the instantaneous value of said parameter for producing an output signal representative of the instantaneous rate of deterioration per unit time of said equipment for said instantaneous value of said parameter; signal generator means responsive to said output signal for producing driving signals at a repetitive frequency representative of the instantaneous value of said output signal; counter means responsive to said driving signals for accumulating the total number of said driving signals, whereby the consumed operating life of said equipment can be computed for a given length of operating time, and testing means selectively interposable before said conversion means for selectively producing a first test input signal which is received by said conversion means; said test input signal being of predetermined known magnitude which will produce a predetermined known accumulation of said driving signals in said counter means if said device is in proper operating condition.

5. The device of claim 4, wherein said testing means includes counter reset means for returning said counter means to the output it had accumulated prior to operation of said testing means.

6. The device of claim 4 and including over temperature switching means responsive to a predetermined magnitude of said output signal of said conversion means for providing an indication thereof and wherein said testing means is selectively capable of producing a second test input signal of sufficient magnitude to activate said over temperature switching means if said device is in proper operating condition.

7. A device for determining the consumed life of an engine of which the consumed life is dependent on time and at least one other parameter, temperature, said device comprising: conversion means responsive to an input signal representative of the instantaneous value of the temperature for producing an output signal representative of the instantaneous rate of deterioration per unit time of said equipment, said conversion means includes selection means operable during water injection in said engine for varying said output signal by an amount corresponding to the decrease in the rate of deterioration of said engine as a function of temperature due to said water injection, signal generator means responsive to said output signal for producing driving signals at a repetitive frequency representative of the instantaneous value of said output signal; and counter means responsive to said driving signals for accumulating the total number of said driving signals; whereby the consumed operating life of said equipment can be computed for a given length of operating time.

8. A device for determining the consumed life of equipment of which the consumed life is dependent on time and at least one other parameter, said device comprising: conversion means responsive to an input signal representative of the instantaneous value of said parameter for producing an output signal representative of the instantaneous rate of deterioration per unit time of said equipment for said instantaneous value of said parameter; signal generator means responsive to said output signal for producing driving signals at a repetitive frequency representative of the instantaneous value of said output signal; counter means responsive to said driving signals for accumulating the total number of said driving signals; whereby the consumed operating life of said equipment can be computed for a given length of operating time, and datum switching means responsive to a predetermined datum magnitude of said output signal for producing a gating signal which allows said driving signals to be passed to said counter means whereby there will be no accumulation of driving signals by said counter means if said output signal does not reach said predetermined datum magnitude, said conversion means includes selection means for varying said output signal by a predetermined amount and for varying the datum magnitude of response of said datum switching means by a predetermined amount when said equipment is operating under special conditions.

9. A device for determining the consumed life of equipment of which the consumed life is dependent on time and at least one other parameter, said device comprising: conversion means responsive to an input signal representative of the instantaneous value of said parameter for producing an output signal representative of the instantaneous rate of deterioration per unit time of said equipment for said instantaneous value of said parameter; signal generator means responsive to said output signal for producing driving signals at a repetitive frequency representative of the instantaneous value of said output signal; said signal generator means comprising a variable ramp generator having a ramp signal rising at a rate dependent upon the magnitude of the output signal from said conversion means, and counter means responsive to said driving signals for accumulating the total number of said driving signals; whereby the consumed operating life of said equipment can be computed for a given length of operating time.

10. The device of claim 9 wherein said signal generator means further includes trigger means responsive to predetermined magnitudes of said ramp signal for reversing said ramp signal at said repetitive frequency.

11. A device for determining the consumed life of equipment of which the consumed life is dependent on time and at least one other parameter, said device comprising: conversion means responsive to an input signal representative of the instantaneous value of said parameter for producing an output signal representative of the instantaneous rate of deterioration per unit time of said equipment for said instantaneous value of said parameter; said conversion means including exponential transistor means connected as a function generator that presents a smooth continuous exponential transfer function representing the deterioration rate of said equipment relative to said parameter, signal generator means responsive to said output signal for producing driving signals at a repetitive frequency representative of the instantaneous value of said output signal; and counter means responsive to said driving signals for accumulating the total number of said driving signals; whereby the consumed operating life of said equipment can be computed for a given length of operating time.

12. The device of claim 11 wherein said exponential transistor means having a $V_{be}$–$I_c$ characteristic such that the output current is exponential with input voltage over at least four decades of output current.

References Cited

UNITED STATES PATENTS

| | | | |
|---|---|---|---|
| 2,981,107 | 4/1961 | Anderson | 73—341 |
| 3,182,507 | 5/1965 | Rogen. | |
| 3,250,901 | 5/1966 | Brahm | 73—117.2 X |
| 3,237,448 | 3/1966 | Howell et al. | 73—117.2 X |
| 3,357,239 | 12/1967 | Hohenberg | 73—116 |
| 3,362,217 | 1/1968 | Evans et al. | 73—116 |

JERRY W. MYRACLE, Primary Examiner

U.S. Cl. X.R.

73—344; 235—183